UNITED STATES PATENT OFFICE.

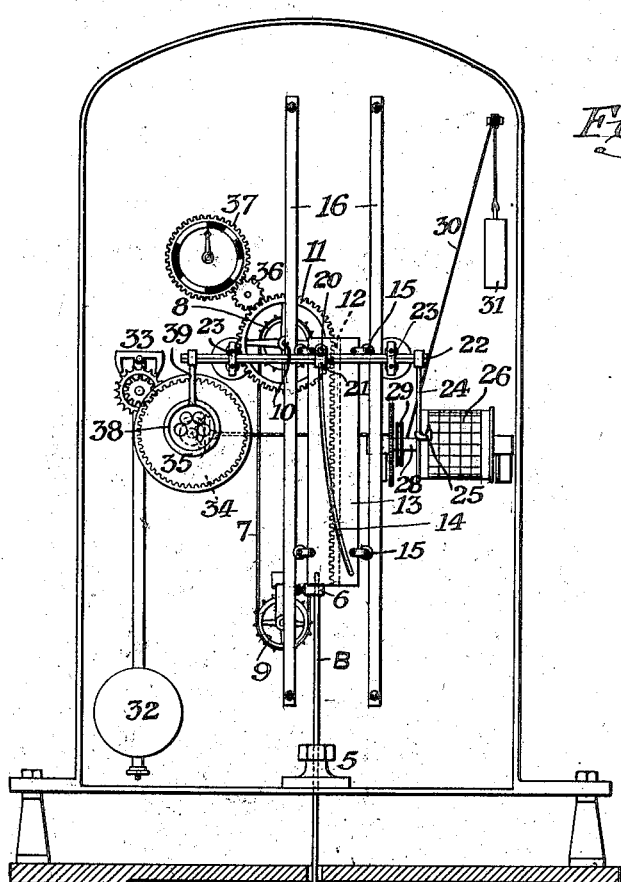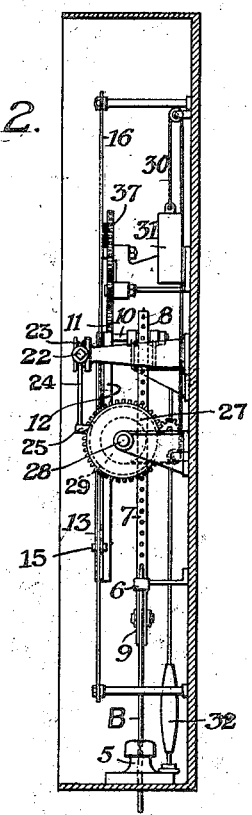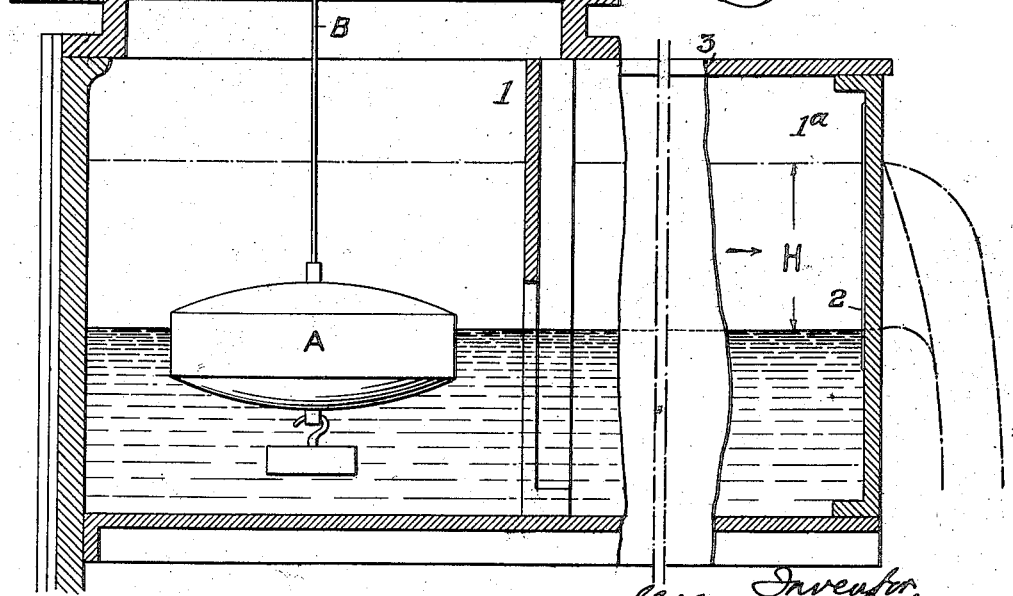

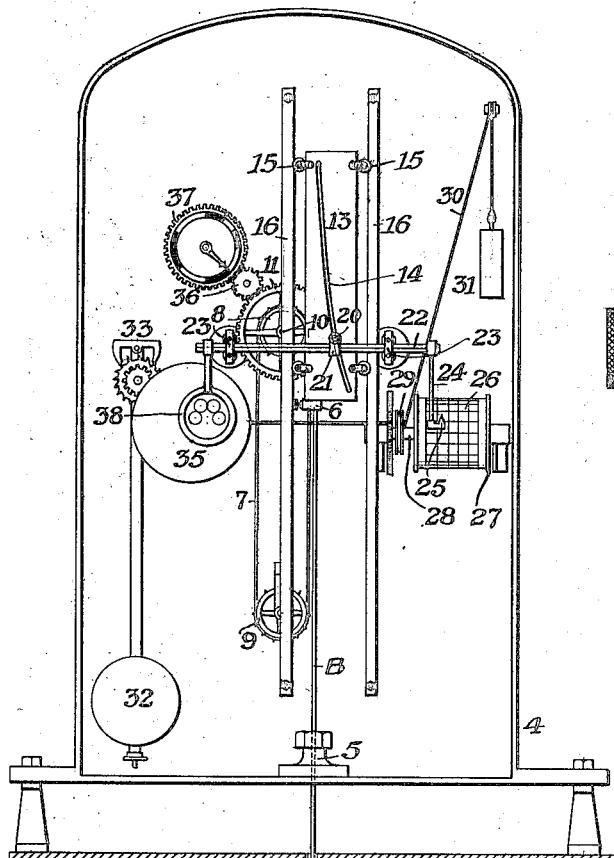

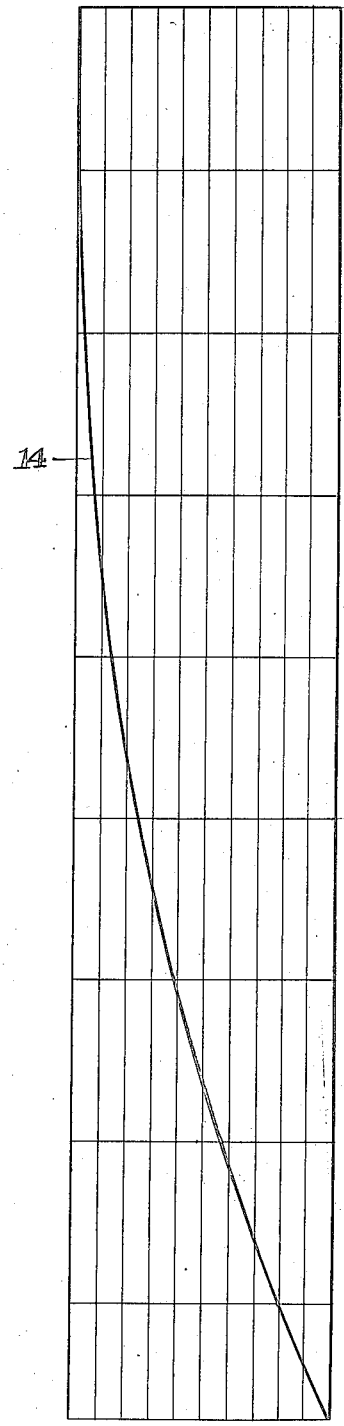

WILLIAM H. LUKENS, OF PHILADELPHIA, PENNSYLVANIA, ASSIGNOR TO WARREN WEBSTER & COMPANY, OF CAMDEN, NEW JERSEY, A CORPORATION OF NEW JERSEY.

DEVICE FOR REGISTERING, RECORDING, AND INDICATING THE FLOW OF LIQUIDS.

1,317,513.  Specification of Letters Patent.  Patented Sept. 30, 1919.

Application filed January 17, 1918. Serial No. 212,279.

*To all whom it may concern:*

Be it known that I, WILLIAM H. LUKENS, a citizen of the United States, residing in Philadelphia, Pennsylvania, have invented Improved Devices for Registering, Recording, and Indicating the Flow of Liquids, of which the following is a specification.

My invention relates to the measurement of flowing liquids; and the object of my invention is to provide improved mechanism for registering, recording, and indicating the flow of liquids. Broadly considered, the improvements forming the subject of my invention may be employed in connection with the flow of any liquid; specifically, the mechanism is employed for the purpose of registering, recording, and indicating the flow of hot water delivered from feed water heaters, whether the same is passed directly to a steam generator or to suitable storage tanks.

Various forms of devices have been employed for measuring the volume of flowing streams of liquid; well known forms being meters of the Venturi tube and Pitot tube type; rectangular weirs; submerged weirs, and V-notch weirs, and while my improved mechanism with certain modifications may be employed with any one or all of these flow measuring devices, the present construction has been designed for use in connection with a V-notch weir of sharp angle construction, mounted in the path of quiescent flowing water; the varying height of the surface level of the water flowing over the weir in any period of time being made a function of the formulæ for determining the volume of flow in pounds.

These and other features of my invention are more fully described hereinafter, reference being had to the accompanying drawing, in which:

Figure 1, is a view in elevation of my improved registering, recording, and indicating mechanism mounted with respect to a chamber or chambers receiving the flowing water; one of such chambers having a V-notch weir over which the water flows.

Fig. 2, is a side elevation of the same, partly in section.

Fig. 3, is a view similar to Fig. 1, showing the parts of the registering, recording, and indicating mechanism in another position.

Fig. 4, is a sectional view of a detail of my invention, and

Fig. 5, is an enlarged view of the cam plate which I employ.

A float A, usually submerged, is disposed in a compartment 1, into which water is admitted from the main approach chamber through a suitable opening (not shown) and registers the varying heads indicated by "H" as the water flows over a V-notch weir 2 forming the outlet from a compartment 1ª in free communication with the compartment 1.

Above a tank 3 or other structure having the compartments 1 and 1ª through which the water flows, or mounted at some convenient point with reference thereto, is a casing 4 for the registering, recording, and indicating mechanism constituting my invention; the same being set with care, with the parts in definite position vertically and horizontally, as conditions connected with the operation of the structure may require.

Attached to the float A is a rigidly connected rod B, passing out of the tank through the bottom of the instrument case, which is provided with a suitable gland 5 to prevent entrance of any steam or vapor that would affect the operation of any part of the mechanism within such case.

The upper end of the rod B is attached by a suitable coupling 6 to a flexible perforated steel tape or equivalent element 7, arranged to run over pulleys 8 and 9. The pulley 8 is mounted on a shaft 10, and said shaft carries a gear wheel 11 meshing with a cut rack 12 fastened rigidly to the back of a cam plate 13 arranged to rise and fall with reference to the casing in which the mechanism is mounted. On this cam plate 13 is indicated a curve of flow 14, which curve represents the quantity of water flowing over the V-notch weir at different heads and which translates the amount of flow from cubic feet per second or volumetric measurement, into pounds per hour, and which is designed to correct uneven head distance of the V-notch weir into even increments of flow representing even amounts.

The cam plate carries a plurality of pivoted rollers 15, four in the present instance, secured to the plate in such manner that it may ride vertically along tracks 16, which may consist of small, square angled bars, accurately cut and so spaced with reference to the rollers of the cam plate that the latter may rise and fall between them with a minimum amount of friction and lost motion. The curve of flow indicated upon the cam plate may be in the form of a groove, in which case it may be engaged by a pin, or it may be in the form of a rib over which the bifurcated end of the pin may slide. In the present instance, the cam plate is grooved to indicate the curve of flow, and resting in the groove is a firing pin 20 which may be and preferably is of the type illustrated in the pending application of Edward G. Jay, jr., for registering and recording instrument for meters, filed August 4, 1917, Serial No. 184,506, and is clearly shown in Fig. 4.

A carrier 21 for the firing pin is fixed on a horizontally placed slider bar 22 having a rectangular and preferably square cross section angularly disposed, which bar is in turn mounted on roller brackets 23, allowing it free longitudinal motion; (laterally with respect to the instrument case 5).

One end of the slider bar 22 carries a flexible arm 24 holding a recording pen 25 arranged to rest against the surface of a removable chart 26, carried by a drum 27; such removable chart being suitably divided into periods of time and upon which the curve of flow is recorded. The chart drum is fixed upon a shaft 28 and carries a sheave 29 around which a cord 30 is wound attached to a falling weight 31. The power of this falling weight is connected to a suitable train of gears; the speed and distance of its fall being regulated through this gear train by a pendulum 32. This pendulum is operated by a dead beat escapement 33, which rotates a spur wheel 34 carrying a friction disk 35 in unison with the chart drum 27, through the same clock movement.

Meshing with the gear wheel 11 is an idler pinion 36, which in turn meshes with an indicating gear 37. An integrator 38, of usual construction, for registering the total volume of water flowing over the weir in a given time may be carried by an arm 39 at the opposite end of the slide bar 22; such integrator overlying the friction disk 35 and being operated by a friction wheel (not shown). This registering element or integrator 38 is traversed from the center of the disk radially toward its periphery by movement of the slider bar; hence the speed of its dials will be varied according to changes in the surface level of the water flowing over the weir affecting position of the slider bar by engagement of the cam with the firing pin.

The operation of my improved structure is as follows: When no water is flowing through the V-notch weir, the float will be at zero or in the position shown in Fig. 1 of the drawings. As the volume of water increases in the weir tank, it will be seen that the head "H" will increase and the float A will rise and maintain the same relation to the surface of the flowing liquid as it had in its floating position while at zero. When the float rises, the motion is transmitted through float rod B to the flexible perforated steel tape or other endless element 7, which in turn revolves the pulley 8 and the gear wheel 11. The gear wheel being in engagement with the rack 12 on the back of the cam plate, causes such plate to move upward along the tracks 16. A curve of flow upon the surface of the cam plate has an increasing thrust, and it will be seen that the firing pin which rests in the groove forming the curve will cause the slider bar 22 to move in the roller brackets.

The arms rigidly fixed to the ends of the bar will also move; the one carrying the pen causing it to record upon the drum chart, and such drum being revolved away from the pen will thus cause a line indicating the varying flow of water over the V-notch weir to be recorded upon its surface. At the other end of the slider bar, the registering element 38 will be carried across the face of the friction disk 35 which is revolving in such manner that the quantity recorded on the chart will be registered on the face of the dial of said element 38. At the same time, the idler pinion 36 will revolve the indicator gear in such manner as to cause the latter to indicate the varying quantities represented by the changing heads H on the V-notch weir; giving instantaneous quantitative readings.

The above description of the operation of my improved mechanism gives a clear idea of the manner in which this instrument translates the well known formula for the flow of water over a 90° V-notch, which is $$Q = CH^{\frac{5}{2}}$$

in which Q represents the quantity of water per second; C the constant, and H the head or height of water flowing over the weir into quantities for a given time; combining a registering dial, a recording chart, and an instantaneous indicator.

While my improved mechanism has been described with reference to a V-notch of 90°, it will be understood that notches having volumetric areas equaling half 90°, quarter-90°, or eighth-90°, may be employed; the improved mechanism described taking care of such changes in the size of the weir when set for the changed condition; the head of liquid at the quantity in pounds per hour to be measured being known prior to setting such mechanism.

Assuming for instance that it is desired to measure 200,000 lbs. of water per hour, I may employ a 90° V-notch weir, with a head of 8", and a temperature range up to 212°. My improved mechanism, set to register, record, and indicate readings of any part of this quantity of water, may be employed to register, record, and indicate a delivery of one-half the quantity, or 100,000 lbs. per hour with a head of 8", by simply changing the V-notch weir from a full 90° to half 90°. However, should the change desired be in amounts less or greater than an exact halving or multiple of the quantity delivered under the known conditions of V-notch area and head above noted, other factors must be considered, and for this purpose the gearing between the rack on the moving cam plate and the indicator would require change. In such case a change would also be made in the size of the upper pulley, accompanied by a change in the position of the idler 36, and the indicator gear 37.

I claim:

1. In a device for registering, recording and indicating the flow of liquids, the combination of a float actuated by the head of flowing liquid, a slidable traverse bar, a firing pin movable with said traverse bar, a plate adapted to be raised and lowered in consonance with the movement of said float, a gear wheel, and a rack on the plate in operative engagement therewith for effecting movement of the latter, and a cam carried by said plate and in operative engagement with said firing pin for laterally shifting the latter and changing the position of the traverse bar carrying the same as the plate rises and falls.

2. In a device for registering, recording and indicating the flow of liquids, the combination of a float actuated by the head of flowing liquid, a slidable traverse bar, a firing pin movable with said traverse bar, an endless band connected to the float and actuated vertically thereby, a gear wheel rotated by said endless band, a plate raised and lowered by said gear wheel, said plate having a rack in operative engagement with the gear wheel, and a cam constituting a flow curve carried by said plate and in operative engagement with said firing pin for shifting the latter and changing the position of the traverse bar carrying the same.

3. In a device for registering, recording and indicating the flow of liquids, the combination of a float actuated by the head of flowing liquid, a slidable traverse bar, a firing pin movable with said traverse bar, an endless band connected to the float and actuated vertically thereby, a gear wheel rotated by said endless band, a plate raised and lowered by said gear wheel, said plate having a rack in operative engagement with the gear wheel, a cam constituting a flow curve carried by said plate and in operative engagement with said firing pin for shifting the latter and changing the position of the traverse bar carrying the same, and independent means for registering, recording, and indicating the flow over the weir as the latter effects changes in the position of the cam and the traverse bar controlled thereby.

4. In a device for registering, recording and indicating the flow of liquids, the combination of a tank receiving a quiescent body of liquid, a float in said tank responsive to the head of liquid therein, a vertically movable cam plate, a gear wheel, operatively connected with said float, a rack on the plate in operative engagement with the gear wheel for effecting movement of the latter, a traverse bar, a firing pin secured to said traverse bar and movable with the same under control of the cam plate; said pin engaging the cam, a rotating drum having a chart, and a pen carried by the traverse bar and adapted to engage the chart.

5. In a device for registering, recording and indicating the flow of liquids, the combination of a tank having a chamber containing a quiescent body of flowing liquid, a float responsive to the head of liquid in said chamber, a rod connected to said float, a cam plate, a gear wheel, a rack on the cam plate operatively connecting the latter with the float rod and movable with the same, a horizontally mounted traverse bar freely movable longitudinally, a firing pin fixed to said traverse bar and in operative engagement with the cam, an indicator carried at one end of the traverse bar, a recording pen carried at the opposite end of the traverse bar, a friction disk for operating said indicator, a movable chart drum with which said pen engages, and a single source of synchronized energy for driving the indicator and drum.

6. In a device for registering, recording and indicating the flow of liquids, the combination of a tank having a chamber containing a quiescent body of flowing liquid, a float responsive to the head of liquid in said chamber, a rod connected to said float, an endless band forming a means for translating vertical movement of said float rod into rotary movement, a cam plate operatively connected to the endless band and movable with the same, a horizontally mounted traverse bar freely movable longitudinally, a firing pin fixed to said traverse bar and operatively engaging the cam, an indicator carried at one end of the traverse bar, a recording pen carried at the opposite end of the traverse bar, a friction disk for operating said indicator, a movable chart drum with which said pen engages, and a single source of synchronized energy for driving the indicator and drum.

7. In a device for registering, recording and indicating the flow of liquids, the combination with a float actuated by the head of the flowing liquid, an endless band connected to the float and actuated vertically thereby, a gear wheel rotated by said endless band, a cam plate, and a rack carried by said cam plate in operative engagement with said gear wheel whereby the cam plate may be raised and lowered by the movement of said endless band, of an indicator, and gearing operated by the cam plate actuating means for operating said indicator; the latter showing the weight rate per hour of water passing over the weir at any moment.

8. In a device for registering, recording and indicating the flow of liquids, the combination with a freely movable traverse bar, a firing pin carried by said bar, a freely movable cam plate having a flow curve mechanically engaged by said firing pin for effecting longitudinal movement of the traverse bar, a float actuated by the head of the flowing liquid, an endless band connected to the float and actuated vertically thereby, a gear wheel rotated by said endless band, and a rack carried by said cam plate in operative engagement with the gear wheel, of an indicator, and gearing actuated by the means effecting the raising and lowering of the cam plate for operating said indicator; the latter showing the weight rate per hour of water passing over the weir at any moment.

9. In a device for registering, recording and indicating the flow of liquids, a freely movable traverse bar, a firing pin carried by said bar, a vertically movable cam plate having a flow curve mechanically engaged by said firing pin for effecting longitudinal movement of the traverse bar, a float actuated by the head of the flowing liquid, an endless band connected to the float and actuated vertically thereby, a gear wheel rotated by said endless band, a rack carried by said cam plate in operative engagement with the gear wheel, and means synchronously actuated for registering and recording the movements of said traverse bar.

10. In a device for registering, recording and indicating the flow of liquids, a freely movable traverse bar, a firing pin carried by said bar, a vertically movable cam plate having a flow curve mechanically engaged by said firing pin for effecting longitudinal movement of the traverse bar, a float actuated by the head of the flowing liquid, an endless band connected to the float and actuated vertically thereby, a gear wheel rotated by said endless band; said cam plate having a rack in operative engagement with the gear wheel, and means synchronously actuated for registering and recording the movements of said traverse bar.

WM. H. LUKENS.